United States Patent [19]

Kryscyk

[11] Patent Number: 4,681,336
[45] Date of Patent: Jul. 21, 1987

[54] VARIABLE LENGTH LINK FOR A THREE-POINT HITCH

[75] Inventor: Robert Kryscyk, Ketsch, Fed. Rep. of Germany

[73] Assignee: Deere & Company, Moline, Ill.

[21] Appl. No.: 845,716

[22] Filed: Mar. 28, 1986

[30] Foreign Application Priority Data

Apr. 4, 1985 [DE] Fed. Rep. of Germany ....... 3512428

[51] Int. Cl.$^4$ .............................................. B60D 1/14
[52] U.S. Cl. ................................ 280/482; 280/461 A; 280/479 R; 172/439
[58] Field of Search .......... 280/461 A, 460 A, 456 A, 280/482, 490 R, 490 A, 479 R; 172/439, 438, 453

[56] References Cited

U.S. PATENT DOCUMENTS

| | | | |
|---|---|---|---|
| 3,432,184 | 3/1969 | Tweedy | 280/479 R |
| 3,561,789 | 2/1971 | Stikeleather | 280/479 R |
| 3,572,761 | 3/1971 | Tapp et al. | 280/461 A |
| 3,572,763 | 3/1971 | Cannon et al. | 280/479 R |
| 3,850,450 | 11/1974 | Hadskey | 280/479 R |

Primary Examiner—John A. Pekar

[57] ABSTRACT

A variable length lift link for a three-point hitch has two parts which are threaded together such that one part which is formed as a spindle moves relative to the other as it is rotated. Rotation of the spindle is provided by way of an electric motor which drives the spindle through a step-down transmission, including a worm gear. The electric motor can be controlled from either the operator's station on the vehicle or from behind the vehicle in the area where an implement is attached. Limit switches control the maximum and minimum lengths of the variable length link.

7 Claims, 4 Drawing Figures

VARIABLE LENGTH LINK FOR A THREE-POINT HITCH

BACKGROUND OF THE INVENTION

The present invention relates generally to a variable length link for a vehicle mounted power lift system adapted to connect a working implement to the vehicle and specifically relates to a variable length link for a three-point hitch for an agricultural tractor.

A typical agricultural tractor includes what is commonly referred to as a three-point hitch which is adapted to connect an implement to the tractor and permit the tractor to raise and lower the implement. The typical three-point hitch includes a pair of draft links, a pair of lift links, a pair of lift arms, and a compression or center link. The draft links have their forward ends pivotally connected to the tractor and the rear ends are adapted to be connected to an implement. The lift links interconnect the draft links and the lift arms so that upon rotation of the lift arms, the rear ends of the draft links are raised and lowered. The center link has it forward end pivotally connected to the tractor and its rear end is adapted to be connected to the implement. In the typical three-point hitch, at least one of the lift links is adjustable in length to permit lateral leveling of an attached implement and the center link is usually adjustable in length to permit fore-and-aft leveling of an attached implement. The lift links and center link are normally manually adjustable.

In order to reduce operator effort and permit adjustments on-the-go, there have been suggestions to provide a power operated device to adjust the length of various links on a tractor three-point hitch. For example, U.S. Pat. No. 3,572,761 discloses an adjustable length lift link which incorporates a hydraulic cylinder and piston arrangement for varying the length of the link. U.S. Pat. No. 3,850,450 discloses a center link which includes a hydraulic motor for rotating a screw which varies the length of the link. U.S. Pat. Nos. 3,561,789 and 3,572,763 both disclose an adjustable length center link which may be in the form of a hydraulic cylinder and piston arrangement or an electric motor arrangement. The use of a hydraulic cylinder and piston arrangement to vary the length of a link in a three-point hitch has not been entirely satisfactory since the length of the link could vary due to leakage across the piston. Adjustable length links which used a screw have not been entirely satisfactory since the power requirements have been very large, particularly if adjustments were to be made while the implement is in use.

SUMMARY OF THE INVENTION

The object of the present invention is to provide a variable length link for a vehicle power lift system which is controlled by a high speed torque motor but provides fine adjustments and is easily and conveniently operated.

Another object of the present invention is to provide a variable length link for a vehicle mounted power lift system in which the length is varied by a rotatable screw, the screw being rotated by a motor which is controllable from either the operator's station on the vehicle or from the vicinity of the power lift system.

A more specific object of the invention is to provide a variable length link for a vehicle mounted power lift system in which the length of the link is varied by a rotatable screw controlled by an electric motor and in which the motor drives the screw through a transmission having first and second step-down portions with at least one of the portions including a worm gear engaging and driving a toothed gear.

The above objects and additional objects and advantages of the present invention will become apparent along with the details of construction of a preferred embodiment of the invention from a reading of the following detailed description when taken in conjunction with the accompanying drawings.

DESCRIPTION OF THE PREFERRED EMBODIMENT

Figure 1:
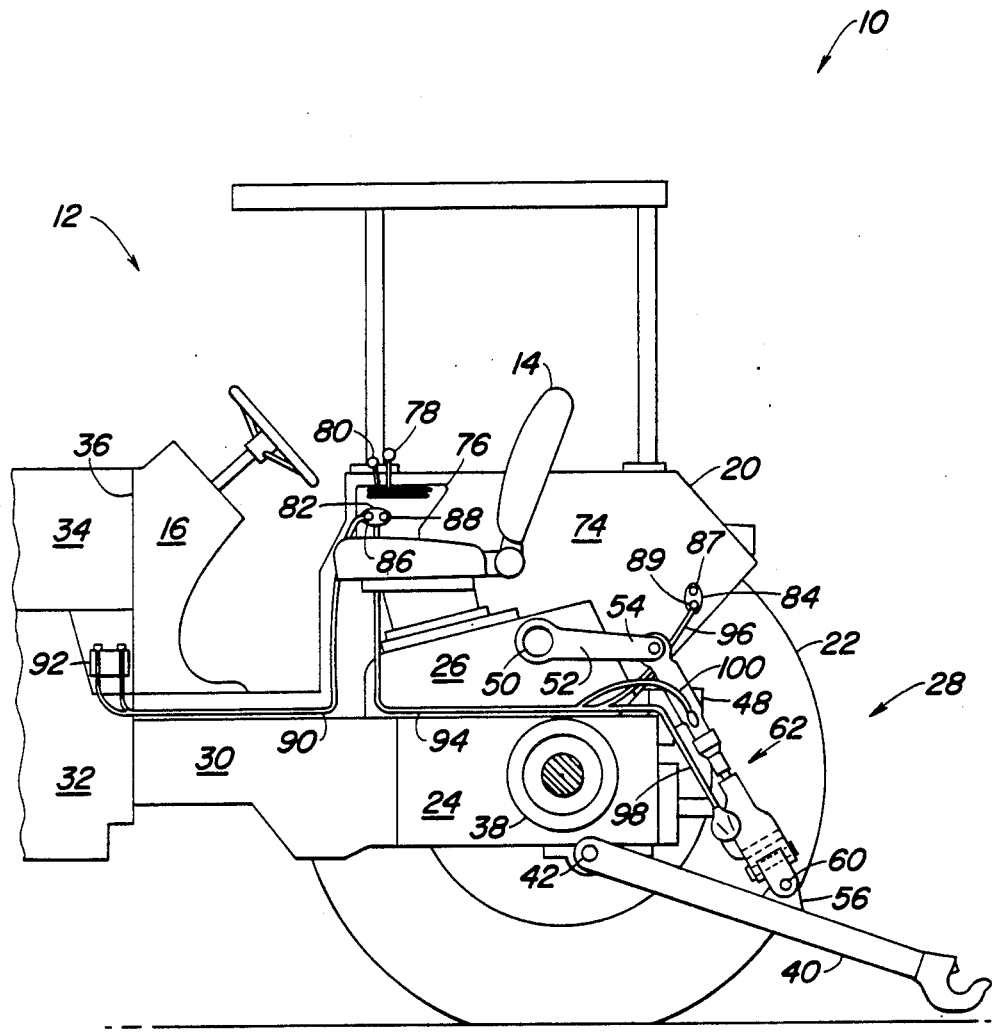
FIG. 1 is a side elevational view of a rearward portion of an agricultural tractor with the left rear wheel and fender removed to better illustrate the various parts of the tractor.

Referring to FIG. 1, an agricultural tractor is indicated generally by the reference numeral 10 and includes an operator's station 12 defined by a seat 14 and a front operating console 16. The operator's station is supported on a transmission casing 24 and a coupling casing 30. The coupling casing 30 is connected to an engine 32 which is covered by a hood 34 having its rear end engaging the front side 36 of the console 16. A final drive housing 38 extends laterally away from each side of the transmission casing 24. An axle 18 extends outwardly from each of the final drive housings and are connected to the tractor rear wheels 22. The near side rear wheel has been removed to illustrate various components of the tractor. A fender 20 is attached to each of the final drive housings 38, extends alongside the driver's station and partially covers the rear wheels 22. Again, the near side fender has been omitted for clarity.

A power lift casing 26 for the tractor three-point hitch is mounted on the transmission casing and, as is typical, contains a hydraulic cylinder which controls the raising and lowering of the three-point hitch.

The power lift system or three-point hitch is indicated generally at 28 and includes a pair of lower draft links 40 which are pivotally connected at 42 to the underside of the transmission casing 24 for both vertical and horizontal movement. While only one draft link 40 is shown in the drawing, those skilled in the art will understand that the various parts of the three-point hitch are duplicated on opposite sides of the tractor except for the center link which is centered on the tractor. A bracket 48 is mounted on the rear of the transmission casing and is adapted to mount the forward end of a compression or upper link which is not illustrated in the drawings. The three-point hitch also includes a lift shaft 50 which extends laterally from both sides of the power lift casing 26 and is pivoted by way of the hydraulic cylinder arrangement which is internal of the casing 26. Lift arms 52 are secured to the outer ends of the shaft 50 for movement in a vertical arc upon pivotal movement of the shaft 50. The rearward ends of the lift arms 54 are pivotally connected to the draft links 40 intermediate the ends thereof by lift links 62. For this purpose, the rear ends of the lift arm 52 are formed as forks 54 and the draft links 40 are provided with lugs 56 intermediate their ends. The forked ends 54 of the lift arms 52 and the lugs 56 are each provided with a bore 58 (see FIG. 2) which receive a pivot pin 60. The upper end of the lift links 62 terminates in the lugs 66 which carries a ball 64 which is positioned in the forked end 54 of the respective lift arm and receives the pivot pin 60. The lower end of the lift link 62 terminates in a fork 70 provided with bores 68 and a universal joint member 72 is positioned within the forked end 70 and is held therein by a pin 71. The universal joint member 72 is provided with a forked end which extends over the lug 56 and connected thereto by the lower pivot pin 60.

Also shown in FIG. 1 is a console 76 mounted on the wall 74 of the fender 20. Two levers 78 and 80 are guided by the consoles 76, one of the levers operating a control valve for controlling the hydraulic cylinder for the power lift system and the other operating a control valve for a remote function as is well known to those skilled in the art. Mounted on the console 76 and on the inward side 74 of the fender 20, toward the rear thereof, are first and second manually actuatable switch packages 82 and 84. The switch packages 82 and 84 have a button switch 86 and 87, respectively, for "lift" and a button switch 8 and 89, respectively, for "lower", as will be more fully explained hereinafter. The first switch 82 is connected by way of a cable 90 to a battery 92 located under the hood 34. A cable harness 92 also goes from the first switch 84 toward the rear of the vehicle where it is divided into a first conduit 96 which goes to the second switch package 84, a second conduit 98 which is connected to the lift link 62 near its bottom and a third conduit 100 which is connected to the lift link 62 near its stop. The details of the electrical circuit will be described hereinafter with reference to FIG. 4.

Figure 2:
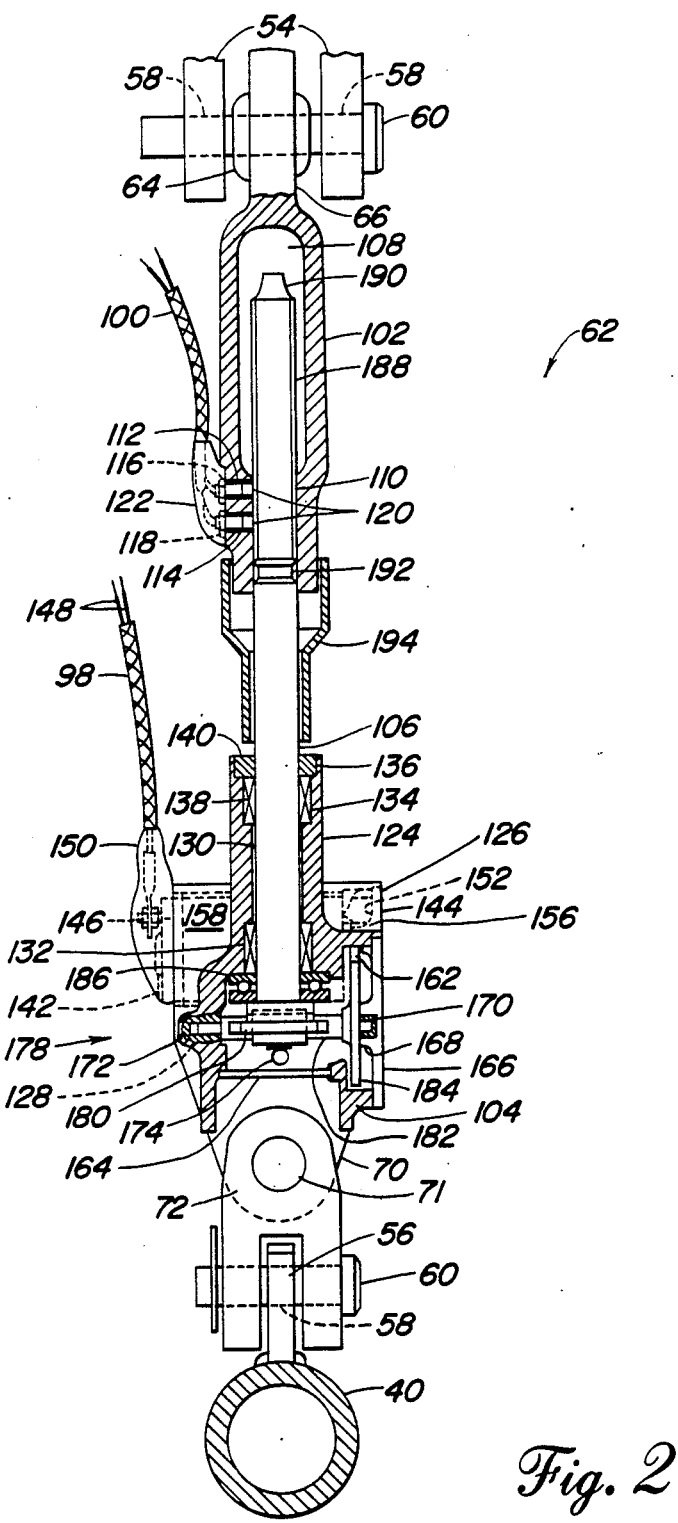
FIG. 2 is a front view, with parts in section, of a variable length link according to the present invention.
Figure 3:
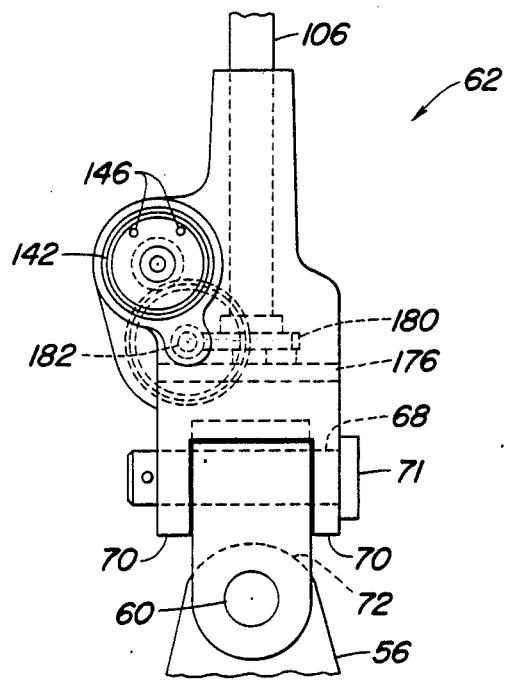
FIG. 3 is a side view of an end portion of the variable length link according to the present invention.

The lift link 62 is shown in more detail in FIGS. 2 and 3 and includes an upper housing portion or anchor element 102 and a lower housing portion or anchor element 104 connected together by way of a screw or threaded spindle 106. The lug 66 which connects the lift link 62 to the lift arm 52 is formed as part of the upper housing 102 and the lower forked end 70 of the lift link 62 is formed as part of the lower housing 104.

The upper housing 102 is provided with a cavity 108 which is open at its lower end by way of a threaded bore 110. Preferably, the inside diameter of the cavity 108 is greater than that of the threaded bore 110, but it will be appreciated by those skilled in the art that the cavity 108 could be formed as an extension of the threaded bore 110. Two bores 112 and 114 extend through a side wall of the housing 102 in the area of the threaded bore 110 and serve to accommodate limit switches 116 and 118. Each limit switch 116 and 118 is provided with a spring loaded push rod 120 which is biased in the direction of the bore 110. The limit switches 116 and 118 are cast in a plug 122 and are connected therein to the third conduit 100. The plug 122 is configured to tightly engage against the housing 102 to prevent moisture from reaching the switches 116 and 118.

The lower housing portion 104 has a neck part 124, a motor housing 126, a transmission housing 128, and the fork 70 which are preferably, but not necessarily, produced from a single casting. The longitudinal center line of neck 124 coincides with the longitudinal center line of the threaded spindle 106 and is normal to the longitudinal center lines of the motor and transmission housings which are indicated in the drawings by the lines MM and GG, respectively. The neck 124 has a longitudinal bore 130 with lower and upper enlarged areas 132 and 143, respectively. At its upper end, the bore 130 is further enlarged to form a sealing chamber 136. Each of the enlarged areas 132 and 134 contain a needle or roller bearing for the spindle 106 and the annular ceiling chamber 136 accommodates a ceiling ring 140 which prevents moisture or dirt from penetrating into the bore 130.

The motor housing 126 is generally of cylindrical shape and is closed off by left and right-hand covers 142 and 144, respectively. On its outside, the left-hand cover 142 carries two connecting terminals 146 which are each connected to a respective wire of the second conduit 98. A rubber or plastic cap 150 protects the terminals 146 from dirt and the influences of weather. The internal surface 152 of the right-hand cover 144 is provided with a bearing neck 156 having a bearing bore 154. The two covers 142 and 144 are secured to the motor housing 126 in any suitable manner such as by being threaded directly to the motor housing 126 or by separate screws.

An electric motor 158 is non-rotatably installed in the motor housing 126 and is axially held in position by means of the covers 142 and 144. A drive shaft 160 extends from the right-hand side of the electric motor 158 and into the bearing bore 154 of the neck portion 156. The drive shaft 160 non-rotatably extends through a small gear 162. A 12 volt, 150 watt electric motor has been found to be suitable. The stator of the electric motor is connected to the terminals 146.

As clearly shown in FIG. 3, the longitudinal center line of a motor housing 126 and the longitudinal center line of the transmission housing 128 are offset laterally from the longitudinal center line of the threaded spindle 106 and also extend parallel to each other.

The transmission housing 128 is open on its right side and on its bottom. The bottom is closed by a cover 164 which is press fit into the housing and the right side of the transmission housing is closed by a cover 166 which is either screwed into the housing or secured against the housing by separate screws. The transmission housing cover 166 is provided with a bearing neck portion 168 and a bearing bore 170. A further bearing bore 172 is provided in the transmission housing 28 in the wall opposite from the cover 166 and in alignment with the longitudinal center line of the bearing bore 170. A pair of bores 174 are provided in the transmission housing 124 in alignment with each other such that a longitudinal center line between the two bores 174 extends transversely with respect to and beneath the longitudinal center line which extends between the two bearing bores 170 and 172. The bores 174 accommodate a pin 176, the purpose of which will be defined hereinafter.

A step-down transmission indicated generally at 178 is disposed in the transmission housing 128 and includes a toothed gear 180 secured to the lower end of the spindle 106, a worm gear 182 which meshes with the gear 180, a large toothed gear 184 for driving the worm gear 182 and the small gear 162. The worm gear 182 is supported at its opposite ends in the bearing bores 170 and 172. The large gear 184 is non-rotatably mounted on the shaft of the worm gear 182 and is in mesh with the small gear 162. The gear 180 and spindle 106 are supported on their lower end on the pin 106 while on the opposite side of the gear 180 a thrust bearing 186 is positioned between the gear 180 and the neck part 124 of the lower housing to prevent axial displacement of the spindle 106.

The spindle 106 is in the form of a round bar with a threaded portion 188 on the upper end thereof. Both at its top and at its bottom, the threaded portion 188 blends into annular grooves 190 and 192 by way of inclined portions. As will become apparent hereinafter, the grooves 190 and 192 define switch portions of the spindle. The length of the threaded portion 188 of the spindle is preferably somewhat greater than the length of the cavity 108 in the housing 102. A funnel shaped protective sleeve engages around the upper housing portion 102 and extends downwardly over the entire length of the spindle 102 which would normally be exposed when the spindle is fully threaded into the upper housing 102. The protective sleeve 194 may be made of sheet metal or an elastomeric material and prevents dirt and other contaminents from reaching the screw threaded bore 110 and the threaded portion 188 of the spindle 106.

As will be apparent to those skilled in the art, when the electric motor 158 is driven in a first direction, it will, through the step-down transmission rotate the spindle 106 in a direction such that it threads into the housing 102 to shorten the overall length of the link 62 and when the motor 158 is driven in the second direction, it will, through the step-down transmission 178, rotate the spindle 106 in a direction to screw the spindle out of the housing 102 and increase the length of the lift link 62.

Figure 4:
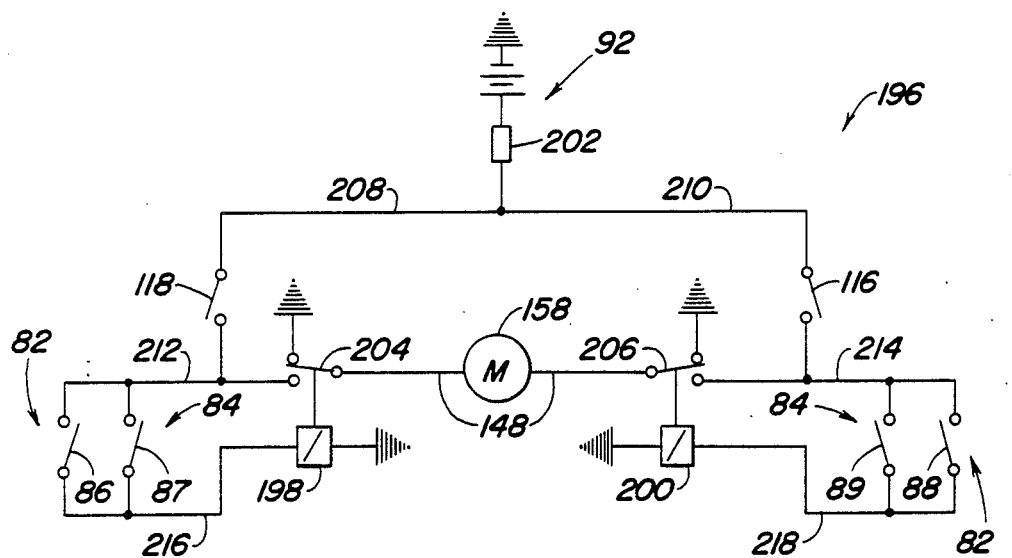
FIG. 4 is an electrical circuit diagram.

The electrical circuit for controlling the motor 158 is illustrated in FIG. 4. In addition to the previously mentioned electric motor 158, battery 92, limit switches 116 and 118, the first and second switch packages 82 and 84, the electrical circuit also includes two relays 198 and 200, a fuse 202 and switches 204 and 206 operated by relays 198 and 200. The two limit switches 116 and 118 are connected in parallel to each other and to the battery 92 by way of wires 210 and 208, respectively, and fuse 202. The switch 118 can be referred to as the upper limit switch and it determines the upper maximum movement of the spindle 106 with respect to the housing 102 and is connected to each of the "lift" button switches 86 and 87 of the switch packages 82 and 84, respectively, by a wire 212. The switch 116 can be referred to as the lower limit switch in that it determines the lowermost position of the spindle 106 with respect to the housing 102 and it is connected to the "lower" button switches 88 and 89 of the switch packages 82 and 84, respectively, by wire 214. The button switches 86 and 87 are connected to a solenoid 198 by a wire 216, the solenoid also being connected to ground. The button switches 88 and 89 are connected to a solenoid 200 by a wire 218, the solenoid 200 also being connected to ground. The solenoid 198 controls a switch 204 which normally grounds one of the motor wires 148 but which connects that motor wire 148 to the wire 212 when the solenoid 198 is actuated. The solenoid 200 controls the switch 206 which normally connects the second motor wire 148 to ground but which connects the second motor wire 148 to the wire 214 when the solenoid 200 is energized.

In the following description of operation, it will be assumed that the spindle 106 is in a mid position so that both of the limit switches 116 and 118 are closed, that all other switches are open, and that the operator will vary the length of the lift link 62 by operating the second switch package 84. If the operator wishes to shorten the lift link 62, he will depress the button switch 87, thus closing the circuit between the battery 92 and the electric motor 158 by way of the wire 208, upper limit switch 118, wire 212, the button switch 87 of switch package 84, and the switch 204. The switch 204 is closed by means of the relay 198 which is actuated by closure of the button switch 87 of the switch package 84. The other wire for the electric motor will remain grounded since the solenoid 200 will not move the switch 206. With the circuit thus completed, the electric motor will drive the transmission 178, rotating the spindle 126 so that it is threaded into the housing 102. As soon as the spindle 106 has moved into the housing the maximum permissible amount, the push rod 120 of the upper limit switch 118 will pass into the annular groove 192 of the spindle 106 and permit the limit switch 118 to open and break the circuit between the battery 92 and motor 158. Once this occurred, further energization of the electric motor can only be by way of one of the "lower" button switches 88 and 89. This causes the motor to rotate in the opposite direction so that it, through the transmission 178, causes the spindle the rotate in the opposite direction and move out of the housing 102. As this occurs, the push rod 120 of the limit switch 118 moves out of the annular groove 190 and again closes the limit switch 118. In like manner, the movement of the spindle 106 out of the housing 102 will be limited by the push rod 120 of the lower limit switch 116 moving into the groove 190.

From the foregoing description of construction and operation, it can be seen that the length of the adjustable length link of the present invention can be varied or controlled by the operator very conveniently from either the operator's station or when he is standing near the rear of the tractor to couple an implement to the hitch. Also, because of the high degree of step-down gearing in the transmission, the motor does not need to be of excessively large size even though adjustments of the length of the link are to be made on-the-go. Further, despite the forces that are exerted on the link 62, the threaded connection between the upper housing 102 and the spindle 106 in combination with the high degree of step-down in the transmission practically insure that the link will not vary in length unless the motor is controlled by the operator.

Having thus described a preferred embodiment of the invention, various modifications or variations thereof will become apparent to those skilled in the art and can be made without departing from the underlying principles of the invention. For example, although the variable length link is shown as a lift link, it can easily be employed as the center or compression link of the three-point hitch. On the lift links could be of a conventional fixed length design, while the other is a variable length link according to the present invention. Therefore, the invention should not be limited to the specific description and illustration, but should only be limited by the spirit and scope of the following claims.

I claim:

1. A variable length link for a vehicle power lift system adapted to connect a working implement to the vehicle, the link comprising: first and second spaced apart anchor elements defining the ends of the link, the first anchor element having a portion with a threaded opening, a spindle having one end rotatably connected to the second anchor element and a threaded portion engaged in the threaded opening of the first anchor element, a motor carried by the second anchor element and having a power output, and means interconnecting the motor and spindle for increasing the power of the motor output and rotating the spindle whereby the threaded engagement between the spindle and first anchor element causes the spindle to move in the direction of its major axis relative to the first anchor element and change the effective length of the link, said means including a first step-down transmission driven by the motor and driving a second step-down transmission, the second step-down transmission includes a worm gear driven by the first step-down transmission and a toothed wheel on the spindle in engagement with the worm gear.

2. A variable length link for a vehicle power lift system adapted to connect a working implement to the vehicle, the link comprising: first and second spaced apart anchor elements defining the ends of the link, the first anchor element having a portion with a threaded opening, a spindle having one end rotatably connected to the second anchor element and a threaded portion engaged in the threaded opening of the first anchor element, a reversible electric motor carried by the second anchor element and having a power output, means interconnecting the motor and spindle for increasing the power of the motor output and rotating the spindle whereby the threaded engagement between the spindle and first anchor element causes the spindle to move in the direction of its major axis relative to the first anchor element and change the effective length of the link, first and second spaced apart switching portions provided on the spindle, and the link further including first and second limit switches engageable with the first and second switching portions to open and disrupt power to the motor whenever the spindle reaches maximum and minimum length positions relative to the first anchor element.

3. A variable length link as set forth in claim 2 wherein said first and second switching portions are recessed areas on the spindle adjacent the opposite ends of the threaded portion of the spindle, the limit switches are mounted on the first anchor element and each includes a spring loaded element which engages the spindle surface.

4. A variable length link as set forth in claim 2 wherein the first anchor element is formed as an elongated housing having a threaded opening at one end, the spindle is threaded into the opening, and the first and second limit switches are mounted in the wall of the housing and include spring loaded switching elements which project into the threaded opening and engage the surface spindle.

5. A variable length link as set forth in claim 4 wherein the first and second switching portions of the spindle are formed by grooves in the spindle into which the spring loaded switching elements project when the spindle reaches a limit of its intended travel.

6. In a vehicle having an operator's station and a power lift system adapted to connect a working implement to the vehicle, the power lift system including a variable length link, the improvement comprising: the variable length link including first and second anchor elements and an interconnecting spindle, the spindle being rotatably connected to the second anchor element and having a threaded engagement with the first anchor element; a reversible electric motor carried by the second anchor element and connected to the spindle through a step-down gear transmission to rotate the spindle whereby the threaded engagement between the spindle and first anchor element causes the spindle to move in the direction of its major axis relative to the first anchor element; an electric circuit connecting said motor to a power source; first and second manually operable motor control means are mounted on the vehicle at the operator's station and in the vicinity of the power lift system, respectively, whereby the motor can be operated and the length of the link varied from either the operator's station or from the vicinity of the power lift system at the option of the operator, each of the first and second manually operable motor control means includes both a first manual switch in the electric circuit which causes the motor to operate in a first direction when closed and a second manual switch in the electric circuit which cause the motor to operate in a second direction when closed with the first manual switches being connected in parallel with each other and the second manual switches being connected in parallel with each other; and first and second limit switches carried by the first anchor element in engagement with the spindle and normally held in a closed condition by the spindle, the spindle includes a first switching portion which permits the first limit switch to open when the link reaches it minimum length condition and a second switching portion spaced from the first switching portion which permits the second limit switch to open when the link reaches it maximum length condition, the first limit switch is in the electrical circuit in series with the first manual switches and the second limit switch is in the electrical circuit in series with the second manual switches.

7. The combination as set forth in claim 6 wherein the step-down gear transmission includes a worm gear driven by the motor and engaging a toothed gear on the spindle.

* * * * *